United States Patent [19] [11] 4,193,310
Boyer et al. [45] Mar. 18, 1980

[54] IDLER PULLEY

[75] Inventors: David C. Boyer, Chicago; Arthur J. Danko, Oak Lawn; William E. Ruehl, Wheeling, all of Ill.

[73] Assignee: Illinois Tool Works Inc., Chicago, Ill.

[21] Appl. No.: 959,815

[22] Filed: Nov. 13, 1978

[51] Int. Cl.² ............................................. F16H 55/48
[52] U.S. Cl. .................................... 74/230.3; 74/242.7; 74/DIG. 10; 308/18; 308/237 R; 308/240; 403/344
[58] Field of Search ............... 74/230.11, 230.3, 242.6, 74/242.7, 230.8, DIG. 10; 308/18, 237 R, 237 A, 238; 403/39, 344

[56] References Cited
U.S. PATENT DOCUMENTS

| | | | |
|---|---|---|---|
| 1,237,950 | 8/1917 | Phillips | 74/230.11 X |
| 1,751,007 | 3/1930 | Kreissig | 74/230.3 X |
| 1,852,092 | 4/1932 | Schaum | 74/230.8 X |
| 2,475,459 | 7/1949 | Pendleton et al. | 74/242.7 |
| 2,615,764 | 10/1952 | Leake | 308/237 R |
| 2,924,109 | 2/1960 | Carriveau | 74/242.7 |
| 2,958,230 | 11/1960 | Haroldson | 74/230.3 |
| 3,785,217 | 1/1974 | Peura | 74/230.3 |
| 3,871,241 | 3/1975 | Pestka et al. | 74/242.11 R |
| 3,947,076 | 3/1976 | Lindeman | 308/103 |
| 4,012,961 | 3/1977 | Cameron | 74/230.7 |
| 4,111,063 | 9/1978 | Journey | 74/242.6 |

Primary Examiner—C. J. Husar
Assistant Examiner—Conrad Berman
Attorney, Agent, or Firm—Jack R. Halvorsen; Robert W. Beart

[57] ABSTRACT

This invention relates to a two piece plastic idler pulley formed of identical portions including a hub, a web and a rim with identical fastening means on the two half portions which permit the two portions to be joined together as the idler pulley. The hub of the idler pulley has a through bore which is inversely tapered whereby the hub will flex when subjected to a workload and will capture the lubricant internally of the bore. The rim carries diverging means which extend radially and laterally outwardly from the rim to insure proper seating of power transmission means such as a belt. The diverging means also is capable of engaging the power transmission belt when it is inadvertently seated on the hub to move the belt into seated relationship on the rim for proper operation of the device.

8 Claims, 10 Drawing Figures

U.S. Patent  Mar. 18, 1980  4,193,310
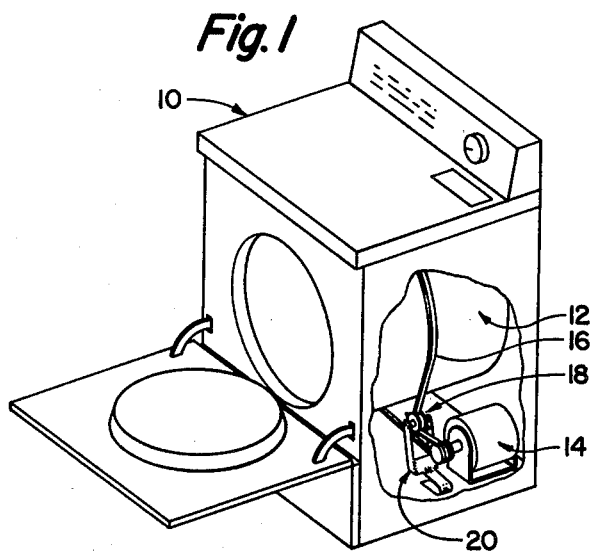
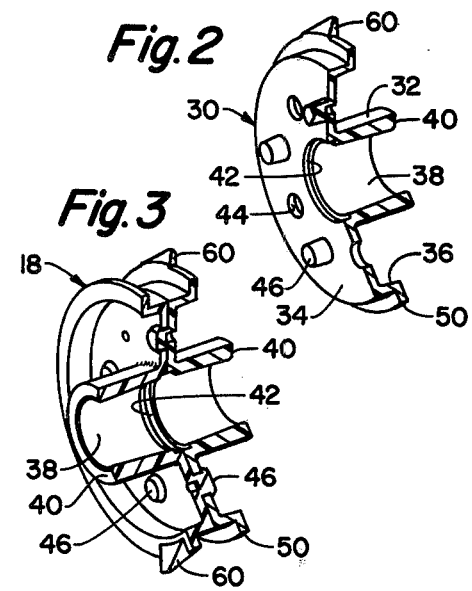
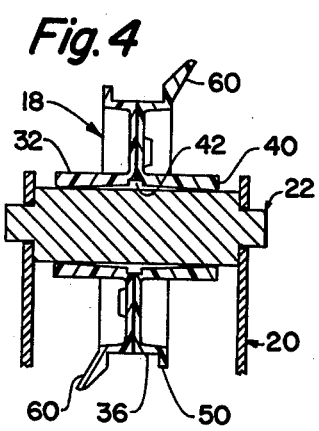
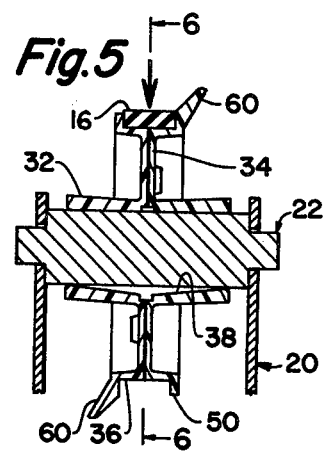
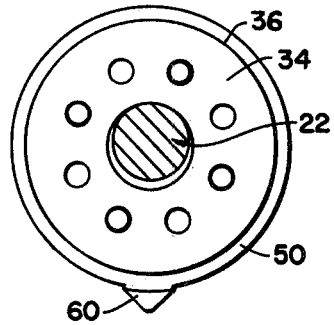
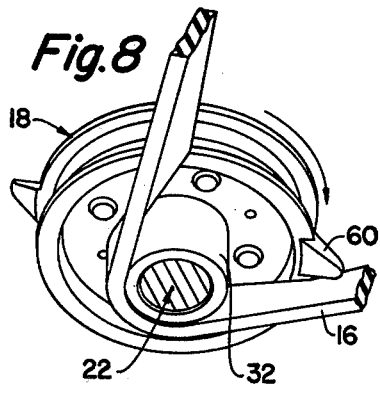
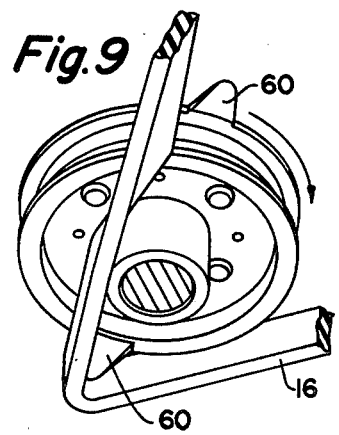
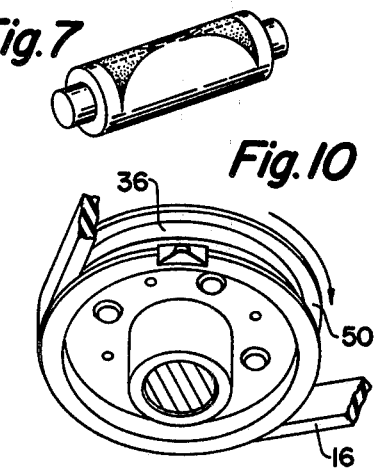

IDLER PULLEY

BACKGROUND OF THE INVENTION

This invention relates generally to pulleys, and more particularly concerns a low cost take-up or idler pulley especially adapted for use in washing machines, clothes dryers or other similar machinery.

The use of plastic pulleys for such purposes is well known in the art, for example the two U.S. patents to the common assignee of this patent, namely U.S. Pat. Nos. 3,871,241 and 3,947,076, for similar usages have revealed a need for lubrication between the pulley and the supporting bearing member. This problem was partially attacked in U.S. Pat. No. 3,947,076 but the solution was not totally satisfactory since it involved the use of a plastic pulley wheel and an oil-impregnated bushing. While this operated satisfactorily under certain conditions, it was found that under extended load conditions there was much to be desired.

Similarly, the use of two piece pulleys is known from the prior art as shown in U.S. Pat. No. 2,958,230 wherein two pieces, one of which has a plurality of holes in the web member while the second piece has a plurality of projecting studs for acceptance within the holes of the web in the first piece to thereby form a pulley.

BRIEF SUMMARY OF THE INVENTION

It is the general object of this invention to provide a take-up or idler pulley at a low finished cost which features relatively permanent lubrication between the rotating pulley member and a stationary bearing, thereby providing long service life.

It is a more specific object of the invention to provide a two piece plastic pulley having a specific design in the bore of the hub which insures a limited contact with the bearing and which specifically serves to retain lubricant within the bore and to thereby insure lubrication particularly when the pulley mechanism is installed in a location making subsequent lubrication difficult or impossible.

Another object of the invention is to provide a pulley mechanism for use in clothes dryers and the like which includes means for seating the power transmission belt in proper oriented relationship to the rim of the pulley. Such means are also capable of seating the pulley on the rim when, if by error in installation, the belt is inadvertently positioned on the hub of the pulley rather than the rim. The means are capable of lifting the belt from this inopportune positionment into proper positionment on the rim in an automatic fashion.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view in partial section of a clothes dryer showing the environment in which the present invention is utilized;

FIG. 2 is a perspective view in partial section of a one-half portion of the present invention;

FIG. 3 is a perspective view in partial section of two identical portions, of the type shown in FIG. 2, which have been joined to form a pulley of the type contemplated by the present invention;

FIG. 4 is an elevational view in section showing the device of the type contemplated by the present invention in mounted relation on a bearing support fork;

FIG. 5 is a view substantially identical to FIG. 4 showing the disposition of the pulley when subjected to a radial force;

FIG. 6 is an end view in partial section taken along the line 6-6 in FIG. 5;

FIG. 7 is a perspective view showing the bearing area on a rigid bearing that is engaged by the bore of the hub of the subject invention when subjected to a radial load of the type shown in FIG. 5;

FIG. 8 is a perspective view in partial section of the present invention showing a belt mounted on the hub of the pulley;

FIG. 9 is similar to FIG. 8 with the pulley rotated approximately 90° and showing the locating means moving and engaging the belt to move the belt into seated position on the rim; and FIG. 10 is a similar perspective view in partial section showing the belt in final seated position on the rim.

DETAILED DESCRIPTION

While the invention will be described in connection with the preferred embodiment, it will be understood that it is not intended to limit the invention to this embodiment. On the contrary, it is intended to cover all alternatives, modifications and equivalence as may be included within the spirit and scope of the invention.

Referring first to FIG. 1, there is shown a typical machine or device using the present invention, such as a clothes dryer 10 which includes a clothes-containing drum 12, said drum being rotated by a motor 14 which drives a belt 16 looped over the drum 12. To tension the belt 16, the novel idler or take-up pulley 18 is provided. The take-up pulley 18 is a low-cost, yet rugged mechanisim, and to that end, the illustrated pulley 18 generally is mounted on a bearing support fork 20 that carries a bearing 22. The specific details of the bearing fork 20 and bearing 22 are more clearly shown in U.S. Pat. No. 3,947,076 and do not form a specific part of the present invention. For specialized use and increased sophistication, other parts may be added of course, without departing from the invention.

Referring now to FIG. 2, which shows a single one-half portion 30 which when joined with an identical second half forms the pulley 18, as seen in FIG. 3, each half portion includes a hub 32, a web 34, and a rim 36. The hub 32 has a through bore 38 which has a predetermined diameter at its free end 40 which is substantially equal to the diameter of the bearing on which the pulley is to be mounted. The bore 38 increases in diameter to its point of juncture with the web 34. While this can be seen in exaggerated form in FIG. 4, it will be appreciated that this taper is on the order of 0.001–0.005 inches. The hub 32, at its point of juncture with the web 34, is relieved by an annular groove 42 for purposes best set forth hereinafter.

The web 34 is a generally annular planar member having a predetermined number of apertures 44 circumferentially spaced around the web and positioned radially between the hub 32 and the rim 36. Extending outwardly from the web are an equal number of studs 46 which are spaced circumferentially and positioned between the spaced apertures 44. The apertures 44 are complementary in size to the studs 46 and by taking a pair of the half portions 30 and rotating the portions 30 it is possible to bring the webs 34 into juxtaposition with the studs 46 telescoped with and extending through the complementary apertures 44 into a position where the free extremity of the studs 46 extends beyond the opposite face of the adjacent web 34. At this time the studs 46 are upset or deformed to rivet the two half portions 30 into an integral pulley 18, as best seen in FIG. 3. Thus, economies in production can be obtained by having a single mold forming the individual halves 30 which when rotated can be assembled as indicated hereinabove. In the preferred embodiment, the pulley is injection molded of a suitable plastic material such as that sold under the trade name of Delrin 8020.

The rim 36 is provided with an annular upstanding flange 50 which in the completed pulley forms a trough-like rim capable of accepting and seating a power transmission belt 16.

Extending laterally and radially from the flange rim 50 is at least one positioning means 60 which, in the preferred embodiment, is generally triangular shaped in section and tapers from its root or connection with the rim 50 to its rounded apex or free extending extremity. It will be noted that the extremity of the locating means 60 terminates in a plane perpendicular to the axis of the bearing 22 and located at least fifty percent of the distance from the rim 36 and the free extremity of the hub 32, as best seen in FIG. 4, for purposes best set forth hereinafter.

For clarity of illustration, the bearing 32 that is shown in FIGS. 4-10 is displayed as a solid member, however, it has been found that the present device works very well with a split lubricating bearing of the type shown in U.S. Pat. No. 3,947,076. Referring now to FIGS. 4, 5 and 6, the pulley 18 is positioned on a bearing 22 supported by the resilient spring loaded fork 20. The outer extremity 40 of the hub 32 is the area where the bore 38 will nominally rest on the bearing 22 thereby providing a limited cavity because of the inverse taper of the bore 38 and the relief 42 providing a central cavity in the bore. When a belt is spring loaded by the pulley 18 and the resilient fork 20, a force is applied as indicated by the arrow on the belt in FIG. 5. This causes the hub 32 to flex on that side of the bearing 22 and to thereby distribute the load of the hub over a larger area of the bearing 22, as seen in the shaded illustration in FIG. 7. This has two advantages, namely, that if the bore of a pulley is a tight fit on the bearing member it does not leave any room for lubricants. If room is made for lubricants, there is a tendency for the pulley to contact a limited line area as generally shown by the dotted line in FIG. 7 and to provide a very high unit pressure thereby causing heat and leading to the ultimate destruction of the pulley. The present invention, however, has the advantage that when the hub 32 flexes about the reduced area 42 it provides a lower unit pressure, as seen by the large shaded area of contact shown in FIG. 7, as well as providing a cavity on the opposite side of the bearing 22, as seen in FIG. 5, for storage of lubricant which can then be recirculated between the hub 32 and the bearing 22. This of course will provide a longer life to the pulley 18 due to the lower unit pressure which results in lower heat generation as well as providing adequate space for the lubricant to act on the mating surfaces.

Referring now to FIGS. 8 through 10, when a belt 16 is inadvertently located on the hub 32, the movement of the belt will cause rotation of the pulley 18 thereby causing engagement of the locating means 60 with the interior of the belt. Continued movement of the belt by forces provided by the motor 14 results in additional movement of the pulley 18 with the locating means 60 causing the belt to ride up over the rim flange 50 into final seated position on the rim 36, as seen in FIG. 10. The locating means 60 will accomplish this and insure proper seating of the belt 16 in the trough formed by the rim 36 and the flanges 50 regardless of which side of the pulley the belt is initially positioned. As was previously indicated, there are at least one locating means 60 positioned on each flange portion of the pulley. The angular disposition of the locating means 60 about the axis of the pulley is not paramount to its operation, therefore, the locating means 60 on the two halves can be positioned in any angular relationship relative to one another and still be operative.

Thus it is felt that the preferred embodiment of this invention which has been described hereinabove discloses an economical, rugged long life pulley adapted for use in remote locations as an idler pulley, such as within the cabinetry of a clothes dryer.

I claim:

1. A power transmission idler pulley having two identical half portions including a hub, a web and a rim, means on said web for connecting said two half portions together to form said pulley, said hub having an axial length greater than the width of said rim and having a through bore for mounting on a predetermined diameter axle means, said hub further having a diametral measurement at opposite ends substantially equal to said predetermined diameter and increasing in diameter towards said web whereby said hub initially rides on said axle means only at its free ends but when subjected to a load in a direction perpendicular to the axis of said axle means said hub flexes to bring one intermediate side of said bore into more intimate contact with said axle means and moves the opposite side of said bore away from said axle, the free ends of said bore remaining in contact with said axle means whereby lubricant can be substantially captured within said bore, and diverging means extending radially and laterally outwardly from said rim to insure proper seating of said power transmission means.

2. A pulley of the type claimed in claim 1 wherein said identical halves are injection molded of thermoplastic material.

3. A pulley of the type claimed in claim 1 wherein said bore forms a semi-elliptical form of contact with a supporting axle when flexed under load.

4. A pulley of the type claimed in claim 1 wherein each identical half of said pulley includes a substantially flat circular web, a predetermined number of spaced fastening means extending axially from said web in the opposite direction from said hub, a plurality of apertures in said web complimentary in number and size to said fastening means whereby a pair of said identical pulley halves can be oriented with the fastening means on each half projecting through and fastening to the wall of said aperture in the other half when the webs are brought into juxtaposed relationship.

5. A pulley of the type claimed in claim 4 wherein each of said pulley halves are one piece injection molded plastic members, said fastening means are solid integral stud means extending from said web, said stud means being deformable after telescopic assembly with the said complimentary aperture to rivet said webs into permanent juxtaposed relationship.

6. A pulley of the type claimed in claim 4 wherein said rim includes a circumferentially disposed radially extending flange means for retaining said power transmission means.

7. A pulley of the type claimed in claim 6 wherein said diverging means includes at least one substantially rigid ear like member integral with and extending radially and angularly outward from said flange means.

8. A pulley of the type claimed in claim 7 wherein said ear-like member is generally triangular in shape with the apex of said triangle falling on a plane that is perpendicular to the axis of said pulley, said plane passing through said hub at a point at least half-way out of the axial extent of said hub measured from said web to the free end of said hub whereby said triangular ear-like member will engage a power transmission means riding on said hub and move said transmission means into position within the trough formed by said rim and flange means.

* * * * *